(12) United States Patent
Chou (10) Patent No.: US 7,100,436 B2
(45) Date of Patent: Sep. 5, 2006

(54) TIRE PRESSURE GAUGE

(75) Inventor: Chiu-Sung Chou, Chiayi (TW)

(73) Assignee: Chin Ray Industrial Ltd., Chiayi (TW)

( * ) Notice: Subject to any disclaimer, the term of this patent is extended or adjusted under 35 U.S.C. 154(b) by 0 days.

(21) Appl. No.: 11/030,644

(22) Filed: Jan. 4, 2005

(65) Prior Publication Data

US 2006/0144135 A1   Jul. 6, 2006

(51) Int. Cl.
*B60C 23/02*   (2006.01)

(52) U.S. Cl. ..................... 73/146.3; 73/146.8

(58) Field of Classification Search ............ 73/146, 73/146.2, 146.3, 146.8
See application file for complete search history.

(56) References Cited

U.S. PATENT DOCUMENTS

| | | | | | |
|---|---|---|---|---|---|
| 2,329,039 | A | * | 9/1943 | Fenwick | 73/146.8 |
| 3,170,243 | A | * | 2/1965 | Williams | 33/836 |
| 3,269,019 | A | * | 8/1966 | Krohn | 33/836 |
| 3,521,485 | A | * | 7/1970 | Porter | 73/146.3 |
| 3,696,668 | A | * | 10/1972 | Patrick | 73/146.8 |
| 4,526,030 | A | * | 7/1985 | Vecera, Jr. | 73/146.8 |
| 4,631,831 | A | * | 12/1986 | Bacher et al. | 33/836 |
| 4,916,944 | A | * | 4/1990 | Ho-Chuan | 73/146.8 |
| 4,970,894 | A | * | 11/1990 | Huang | 73/146.8 |
| 5,033,294 | A | * | 7/1991 | Huang | 73/146.8 |
| 5,233,864 | A | * | 8/1993 | Huang | 73/146.8 |
| 5,883,306 | A | * | 3/1999 | Hwang | 73/146.8 |
| 2002/0005066 | A1 | * | 1/2002 | Tanner et al. | 73/146 |
| 2003/0214395 | A1 | * | 11/2003 | Flowerday et al. | 340/445 |
| 2006/0000266 | A1 | * | 1/2006 | Yohr | 73/146 |

FOREIGN PATENT DOCUMENTS

EP            707204 A2 *   4/1996

* cited by examiner

*Primary Examiner*—Edward Lefkowitz
*Assistant Examiner*—George P. Bonanto
(74) *Attorney, Agent, or Firm*—Alan D. Kamrath; Nikolai & Mersereau, P.A.

(57) ABSTRACT

A multi-functional tire pressure gauge includes a housing, an air-guide seat, a diaphragm, a helical seat, an annular seat, a tread-measuring device, a display panel and an air-guiding device. The multi-functional tire pressure gauge can measure tire pressure and tread's depth simultaneously. Specifically, when the diaphragm moves up and down under the effect of the tire pressure, the helical seat converts the up-and-down motion of the diaphragm into circular motion, so that the index pointer can display tire pressure value. Furthermore, the probe extending in treads of the tire can obtain the depth of the tread.

12 Claims, 9 Drawing Sheets

TIRE PRESSURE GAUGE

BACKGROUND OF THE INVENTION

Field of the Invention

The present invention relates to a multi-functional tire pressure gauge and, more particularly, to a multi-functional tire pressure gauge which can measure tire pressure and the tread's depth at the same time.

SUMMARY OF THE INVENTION

The primary object of the present invention is to provide a multi-functional tire pressure gauge that can measure tire pressure and the tread's depth simultaneously. Specifically, when the diaphragm moves up and down under the effect of the tire pressure, the helical seat converts the up-and-down motion of the diaphragm into a circular motion. Thus, the index pointer can display tire pressure value. Furthermore, the probe extending in treads of the tire can obtain the depth of the tread.

A multi-functional tire pressure gauge provided in accordance with the present invention includes a housing, an air-guide seat, a diaphragm, a helical seat, an annular seat, a tread-measuring device, a display panel and an air-guiding device.

The housing is a bowl-shaped, annular, hollow member. On the front end of the housing are mounted a bushing, a transparent piece and a rubber ring. A square hole is defined at a mid section of a peripheral wall of the housing.

The air-guide seat is an annular member having an air hole and is disposed in the housing.

The diaphragm, arranged at the front of the air-guide seat, is made of an alloy by high temperature processing.

An end of the helical seat is connected to the center of the diaphragm, and another end of the helical seat is provided with an index pointer.

The annular seat is a stepped cylindrical reducer-shaped, annular, and hollow member disposed in front of the diaphragm. A front end of the annular seat is provided for pivotally positioning the helical seat. On a peripheral surface of the annular seat is formed a square hole.

The tread-measuring device is inserted in the square hole of the housing and the square hole of the annular seat. The tread-measuring device includes a base, a probe, a slide block, a board, a drive gear, a mid gear and a driven gear.

The display panel is fixed to a front end of the annular seat. On the display panel are printed a circular scale for indicating pressure value and a vertical-arranged scale for indicating status of a tread of a tire.

The air-guide device is a tube connected to the air hole of the air-guide seat. On a mid portion of the air-guide device is disposed a pressure-relief valve which includes a seat, a moving rod, an O-shaped ring and a spring. At a lower end of the air-guide device is provided an air faucet.

The present invention will become more obvious from the following description when taken in connection with the accompanying drawings, which show, for purpose of illustrations only, the preferred embodiment in accordance with the present invention.

DETAILED DESCRIPTION OF THE PREFERRED EMBODIMENT

Referring to FIGS. 1–9, a multi-functional tire pressure gauge 1 in accordance with the present invention is shown and comprises a housing 11, an air-guide seat 12, a diaphragm 13, a helical seat 14, an annular seat 15, a tread-measuring device 16, a display panel 17 and an air-guiding device 18.

Figure 1:
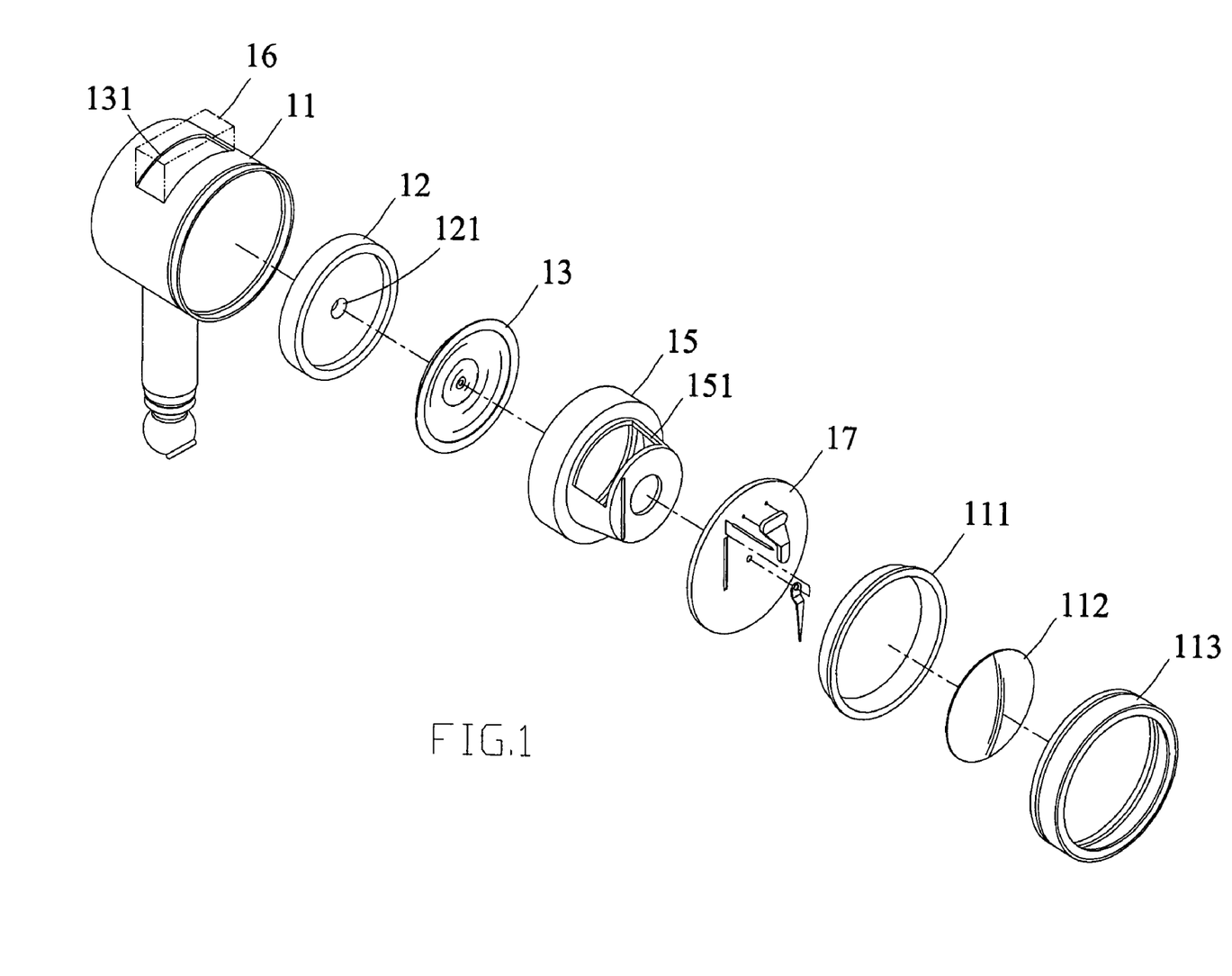
FIG. 1 is an exploded, perspective view of a multi-functional tire pressure gauge in accordance with the present invention.
Figure 2:
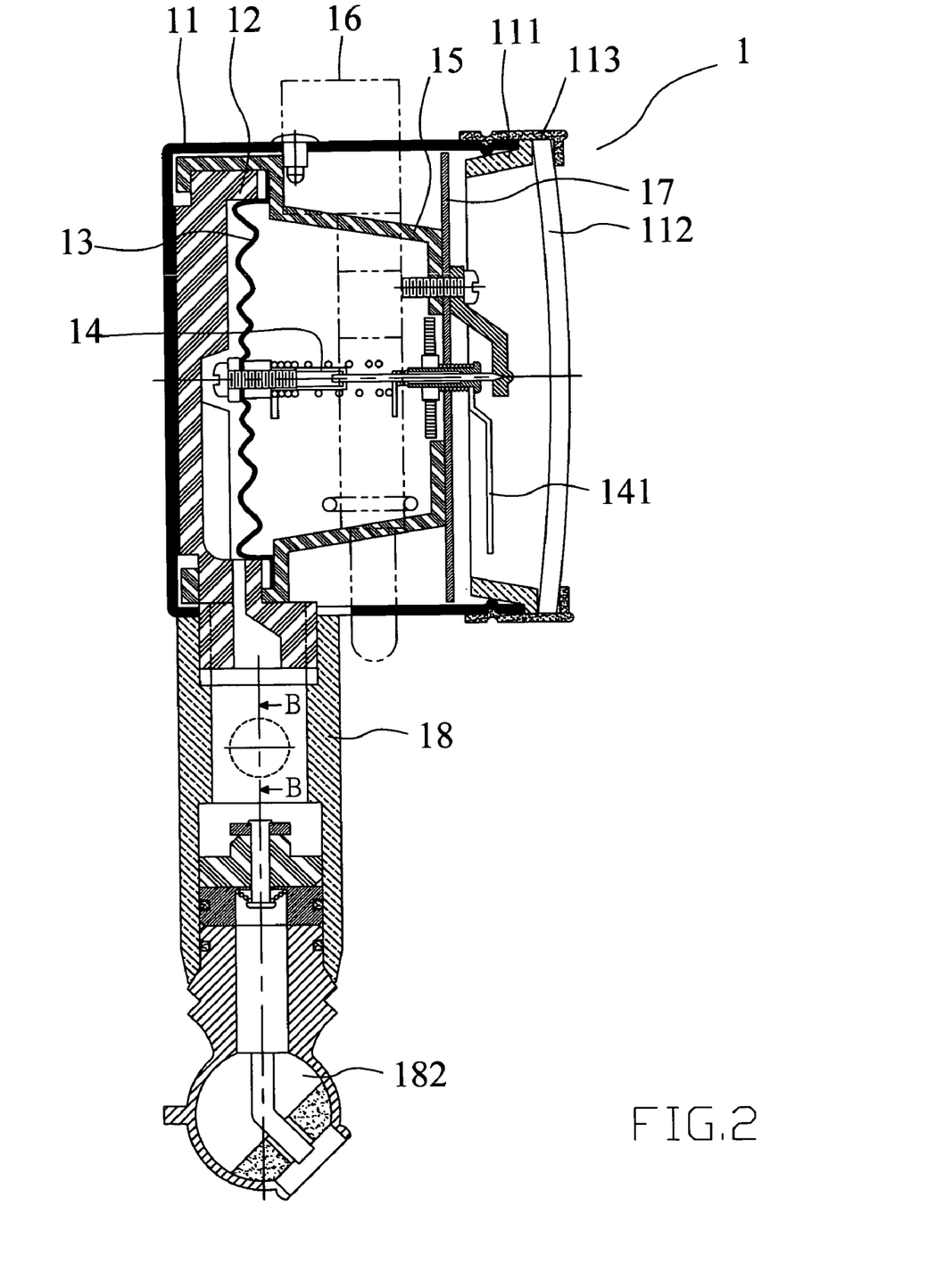
FIG. 2 is an assembly cross sectional view of the multi-functional tire pressure gauge in accordance with the present invention.
Figure 3:
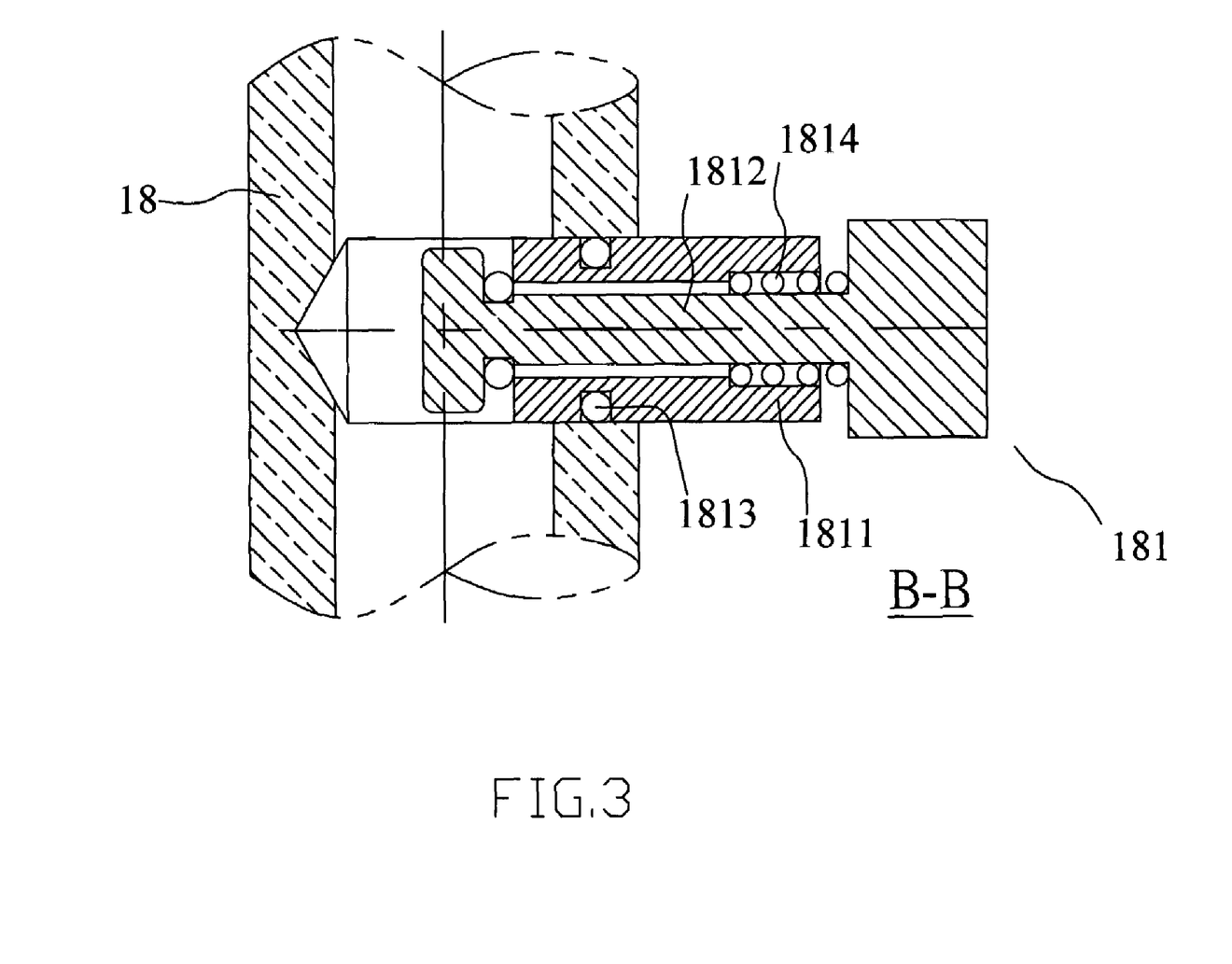
FIG. 3 is an assembly cross sectional view of the multi-functional tire pressure gauge in accordance with the present invention taken along the line B—B of FIG. 2.

The housing 11 is a bowl-shaped, annular, hollow member. On the front end of the housing 11 are mounted a bushing 111, a transparent piece 112 and a rubber ring 113. A square hole 131 is defined at the mid section of the peripheral wall of the housing 11.

The air-guide seat 12 is an annular member having a air hole 121 and is disposed in the housing 11.

The diaphragm 13, arranged at the front of the air-guide seat 12, is made of an alloy by high temperature processing.

An end of the helical seat 14 is connected to the center of the diaphragm 13, and another end of the helical seat 14 is provided with an index pointer 141.

The annular seat 15 is a stepped cylindrical reducer-shaped, annular and hollow member disposed in front of the diaphragm 13. A front end of the annular seat 15 is provided for pivotally positioning the helical seat 14. On the peripheral surface of the annular seat 15 is formed a square hole 151.

Figure 4:
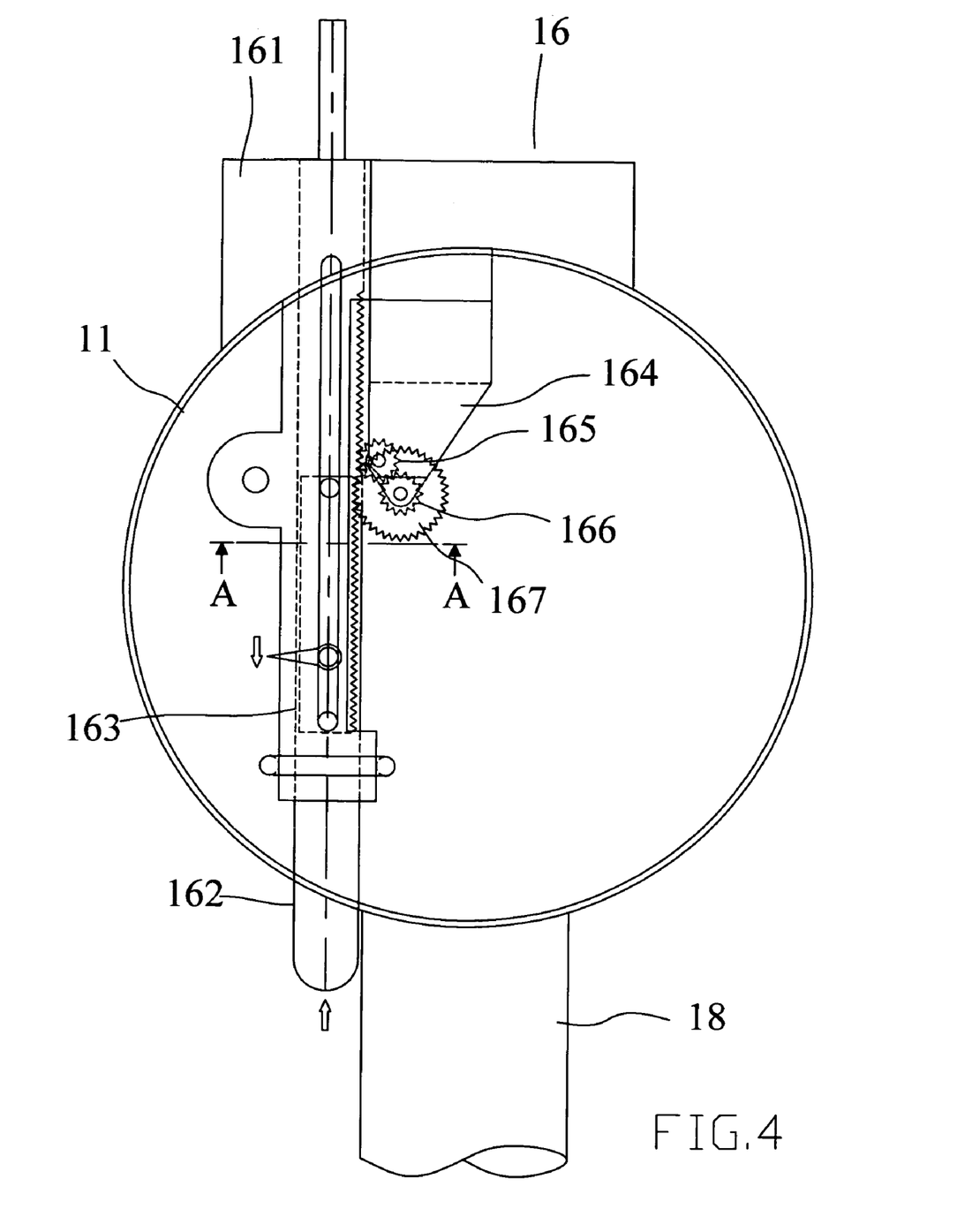
FIG. 4 is a front view of a tread-measuring device on the multi-functional tire pressure gauge in accordance with the present invention, with portions removed for ease of illustration.
Figure 5:
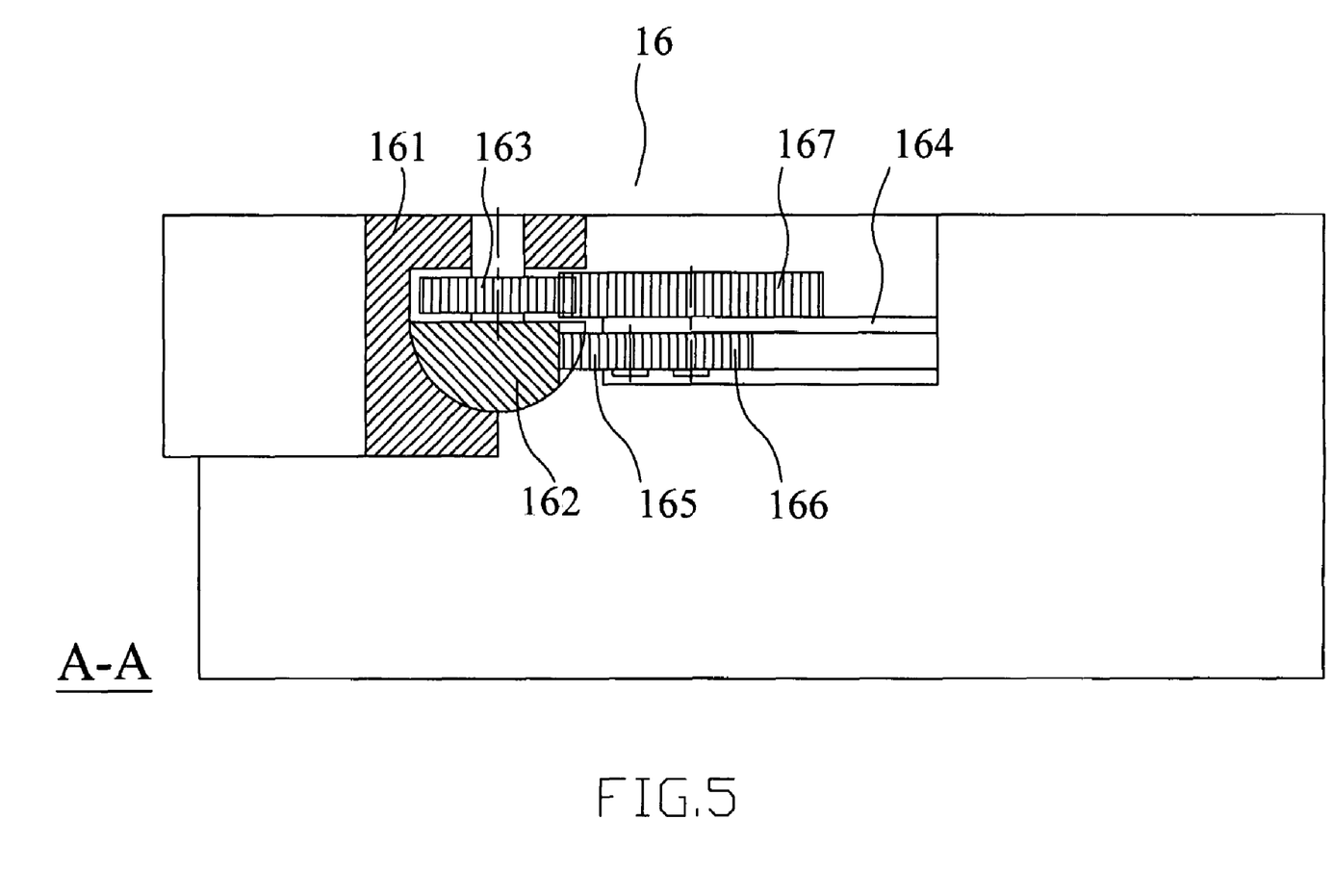
FIG. 5 is an assembly cross sectional view of the tread-measuring device on the multi-functional tire pressure gauge in accordance with the present invention taken along the line A—A of FIG. 4.
Figure 6:
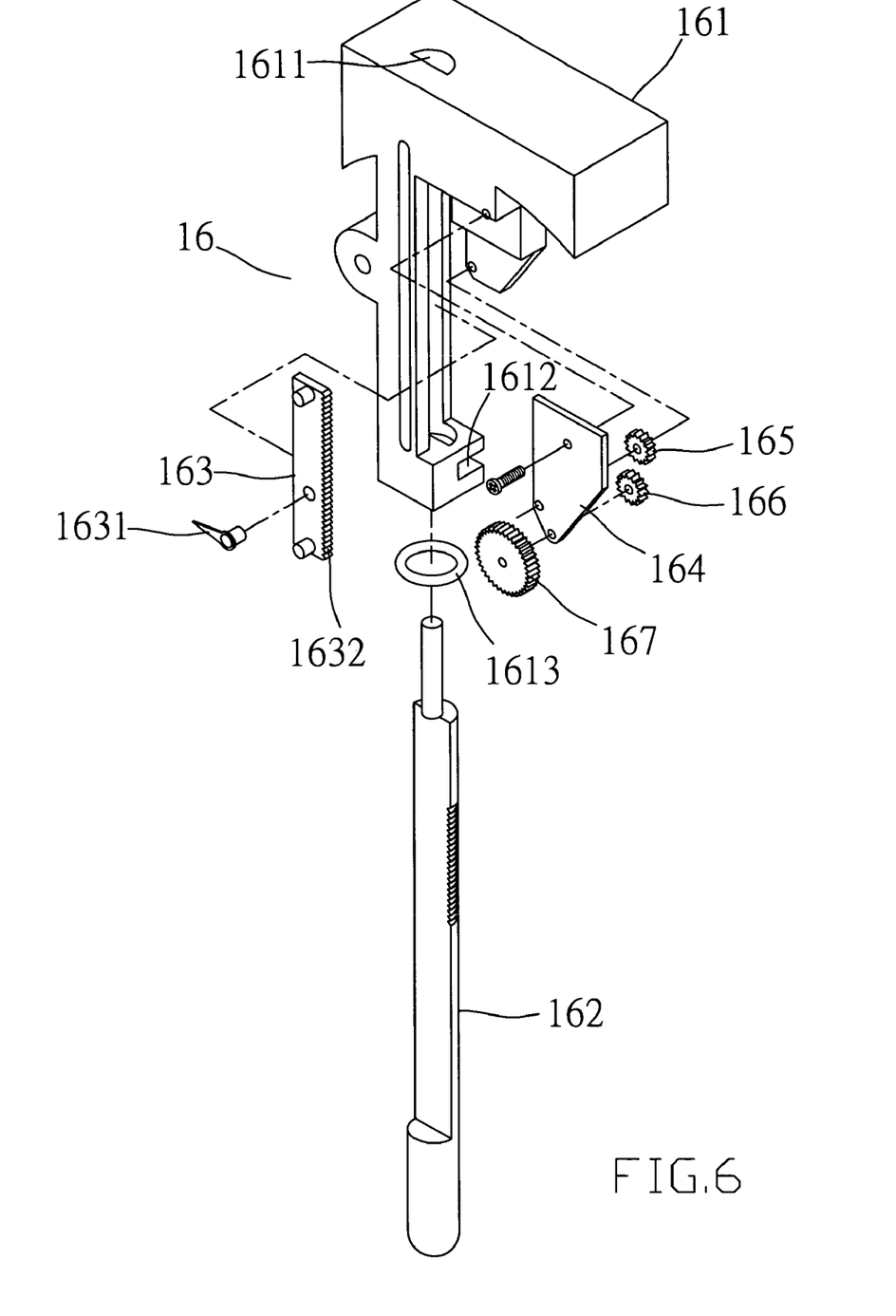
FIG. 6 is an exploded view of the tread-measuring device on the multi-functional tire pressure gauge in accordance with the present invention.

The tread-measuring device 16 is inserted in the square holes 131, 151 of the housing 11 and the annular seat 15, respectively. The tread-measuring device 16 includes a base 161, a probe 162, a slide block 163, a board 164, a drive gear 165, a mid gear 166 and a driven gear 167. The base 161 is a "L"-shaped and includes a lateral portion and a vertical portion. On the lateral portion is formed a half-round through hole 1611 which completely penetrates the vertical portion. On the sidewall of the rear end of the vertical portion of the base 161 is formed a groove 1612 for insertion of a limited-slip ring 1613. The probe 162 inserts from the top into the through hole 1611 of the base 161. The slide of the probe 162 in the axial direction of the through hole 1611 is controlled by the limited-slip ring 1613. The slide block 163 is moveably disposed in the mid section of the through hole 1611 and moves adversely to the probe 162. At the mid portion of the front surface of the slide block 163 is disposed an index pointer 1631. On the side surface of the slide block 163 are provided a plurality of drive teeth 1632. The board 164 is disposed below the lateral portion of the base 161. The drive gear 165 and the mid gear 166 are meshed with each other and are pivotally disposed on the rear surface of the board 164. The driven gear 167 is concentric with the mid gear 166 and is pivotally disposed at the rear surface of the board 164. When the driven gear 167 rotates, the slide block 163 will be caused to move the index pointer 1631 up and down.

The display panel 17 is fixed to the front end of the annular seat 15. On the display panel 17 are printed a circular scale for indicating pressure value and a vertical-arranged scale for indicating the tread status.

The air-guide device 18 is a tube connected to the air hole 121 of the air-guide seat 12. On the mid portion of the air-guide device 18 is disposed a pressure-relief valve 181 which includes a seat 1811, a moving rod 1812, an O-shaped ring 1813 and a spring 1814. At the lower end of the air-guide device 18 is provided an air faucet 182.

The multi-functional tire pressure gauge 1 can be used to measure the tire pressure and the tread's depth at the same time. When the diaphragm 13 moves up and down under the effect of the tire pressure, the helical seat 14 converts the up-and-down motion of the diaphragm 13 into circular motion, so that the index pointer 141 can display the tire pressure value. Furthermore, the probe 162 extending in the treads of the tire can obtain the depth of the tread.

Figure 7:
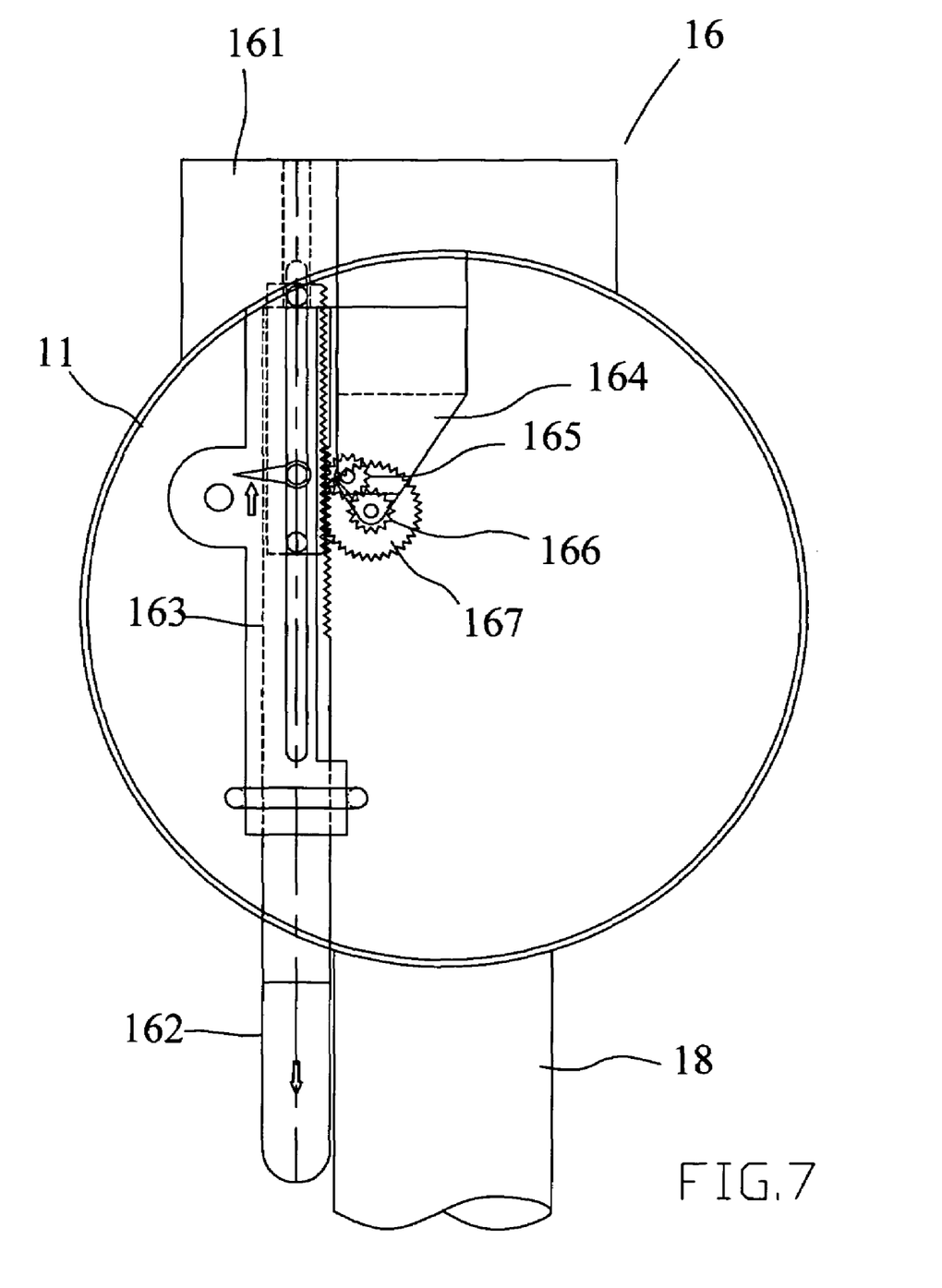
FIG. 7 is an operational view of showing the tread-measuring device on the multi-functional tire pressure gauge in accordance with the present invention, with portion removed for ease of illustration.
Figure 8:
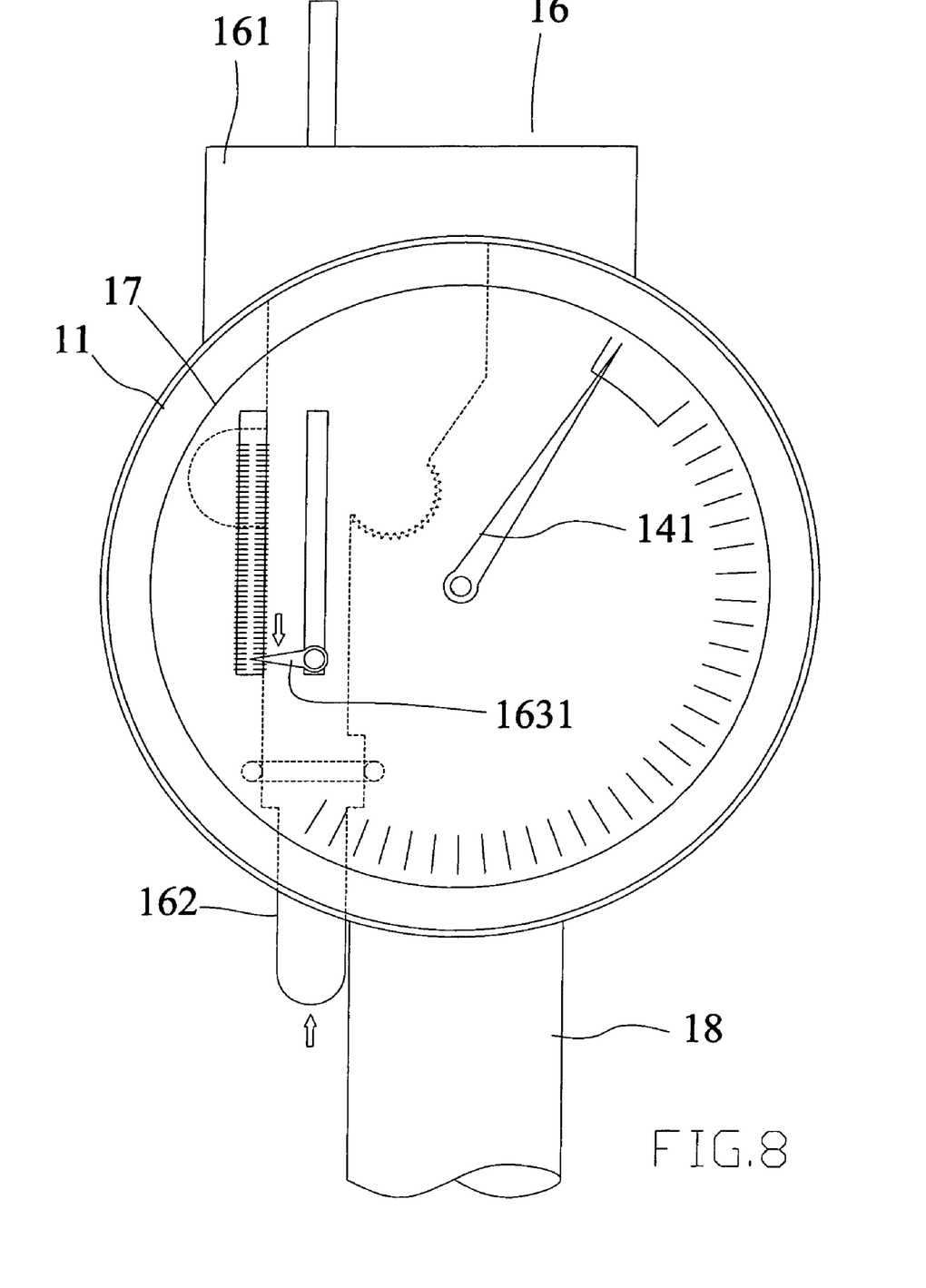
FIG. 8 is an operational view showing the tread-measuring device on the multi-functional tire pressure gauge before the depth of the tread is obtained.
Figure 9:
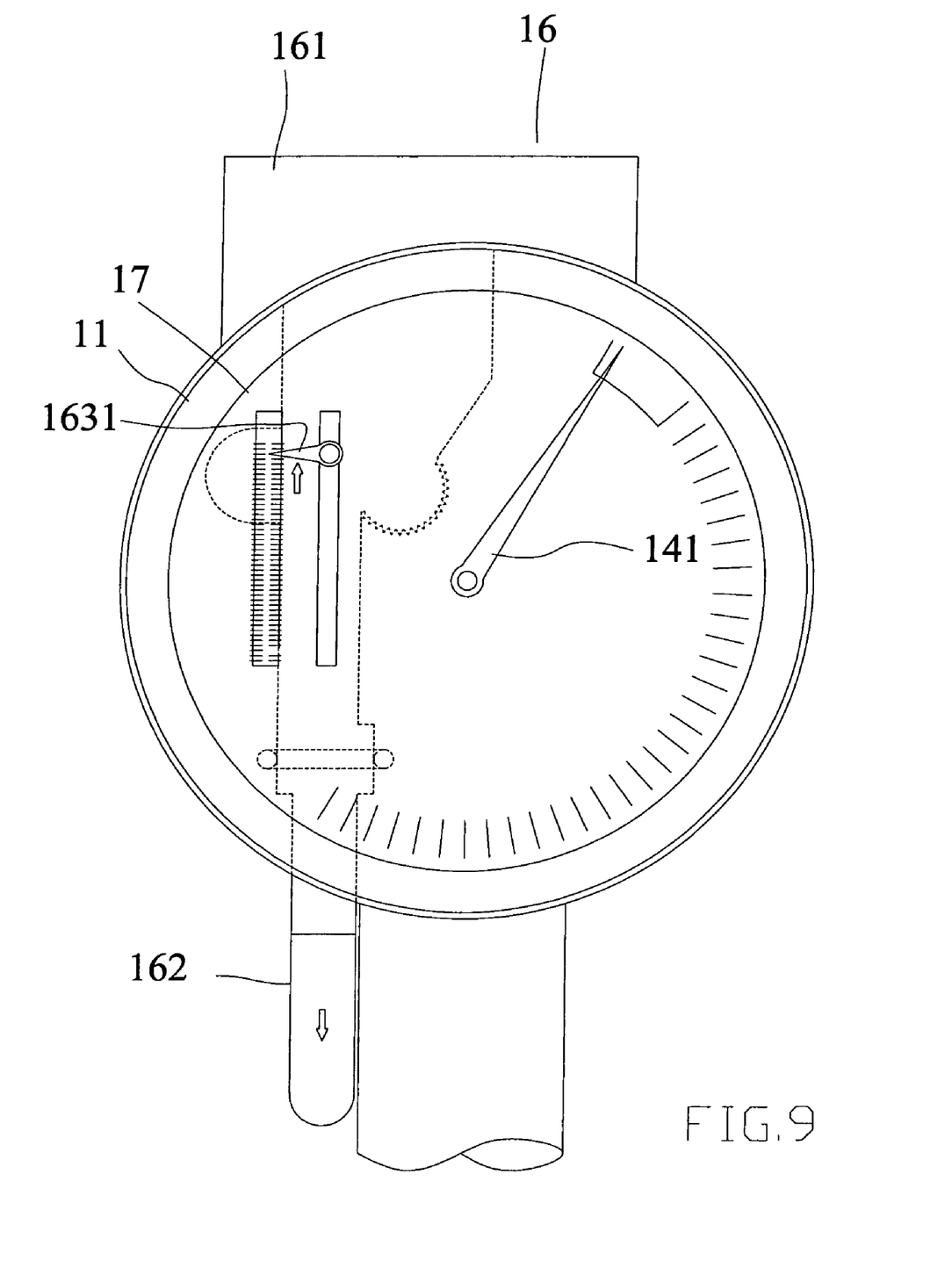
FIG. 9 is an operational view showing the tread-measuring device on the multi-functional tire pressure gauge after the depth of the tread is obtained.

The multi-functional tire pressure gauge 1 of the present invention uses the probe 162 of the tread-measuring device 16 to insert in the tread of a tire, and then the upper surface of the lateral portion of the base 161 is used to flatly abut against the side surface of the tire. At the time the probe 162 is moving back to the base 161, the slide block 163 will move upward under the effect of the drive gear 165, the mid gear 166 and the driven gear 167. Thus, the depth of the tread is measured. The backward motion of the probe 162 into the base 161 is slowed down by the limited-slip ring 1613 and thus, improving the measuring accuracy.

While we have shown and described various embodiments in accordance with the present invention, it should be clear to those skilled in the art that further embodiments may be made without departing from the scope of the present invention.

What is claimed is:

1. A tire gauge comprising:
a housing;
a display panel mounted to the housing, with the display panel including a vertical scale for indicating depth of tread of a tire; and
a tread-measuring device comprising a base, a probe, and a slide block, with the base fixed to the housing, with the slide block and the probe slideably mounted to the housing, with the slide block including a plurality of drive teeth, with the slide block including a pointer, with the plurality of teeth of the slide block in gearing relation with the probe to move the slide block adversely to the probe, with the probe extending in the treads of the tire to indicate the depth of the tread by moving the pointer relative to the vertical scale.

2. The tire gauge as claimed in claim 1 wherein the tread-measuring device includes a plurality of teeth formed on the probe, a driven gear rotatably mounted on the base and meshed with the plurality of teeth formed on the probe; a mid gear rotatably mounted to the base and rotatable with the driven gear; a drive gear rotatably mounted on the base and meshed with the mid gear and with the plurality of teeth formed on the slide block.

3. The tire gauge as claimed in claim 2, wherein the base is "L"-shaped and includes a lateral portion, a vertical portion, and half-round through hole formed on the lateral portion and completely penetrating the vertical portion, with the tire gauge further comprising a limited-slip rings with a sidewall of a rear end of the vertical portion of the base including a groove for insertion of the limited-slip ring, with the probe slideable in the through hole of the base, with sliding of the probe in the through hole controlled by the limited-slip ring, with the slide block moveably disposed in a mid section of the through hole; and a board disposed below the lateral portion of the base, with the drive gear and the mid gear rotatably disposed on a rear surface of the board, with the driven gear concentric with the mid gear and rotatably disposed on a front surface of the board.

4. The tire gauge as claimed in claim 3 further comprising:
a diaphragm mounted in the housing;
a helical seat having a first end connected to the diaphragm and a second end connected to an index pointer, with the display panel further including a circular scale for indicating pressure; and
an air guiding device for communicating tire pressure to the diaphragm to move the diaphragm, the helical seat, and the index pointer, with the index pointer indicating the tire pressure on the circular scale.

5. The tire gauge as claimed in claim 4 further comprising a pressure-relief valve in the air guiding device.

6. The tire gauge as claimed in claim 5 further comprising:
an air-guide seat; and
an annular seat; and wherein
the housing is a bowl-shaped, annular, hollow member;
a bushing, a transparent piece and a rubber ring are mounted on the housing, with a square hole defined at a mid section of a peripheral wall of the housing;
the air-guide seat is an annular member having an air hole and is disposed in the housing;
the diaphragm is arranged at the front the air-guide seat;
the helical seat is connected to the center of the diaphragm;
the annular seat is a stepped cylindrical reducer-shaped, annular and hollow member disposed in front of the diaphragm, with a front end of the annular seat provided for pivotally positioning the helical seat, with a square hole formed on a peripheral surface of the annular seat;
the tread-measuring device is inserted in the square hole of the housing and the square hole of the annular seat;
the display panel is fixed to a front end of the annular seat;
the air-guide device is a tube connected to the air hole of the air-guide seat, wherein the pressure-relief valve comprises a seat, a moving rod, an O-shaped ring and a spring, wherein an air faucet is provided at a lower end of the air-guide device;
the tire gauge can measure tire pressure and tread's depth simultaneously.

7. The tire gauge as claimed in claim 1 further comprising:
a diaphragm mounted in the housing;
a helical seat having a first end connected to the diaphragm and a second end connected to an index pointer, with the display panel further including a circular scale for indicating pressure; and an air guiding device for communicating tire pressure to the diaphragm to move the diaphragm, the helical seat, and the index pointer, with the index pointer indicating the tire pressure on the circular scale.

8. The tire gauge as claimed in claim 7 further comprising:
a pressure-relief valve in the air guiding device.

9. The tire gauge as claimed in claim 8 further comprising:
an air-guide seat; and
an annular seat; and wherein
the housing is a bowl-shaped, annular, hollow member;
a bushing, a transparent piece and a rubber ring are mounted on the housing, with a square hole defined at a mid section of a peripheral wall of the housing;
the air-guide seat is an annular member having an air hole and is disposed in the housing;
the diaphragm is arranged at the front the air-guide seat;
the helical seat is connected to the center of the diaphragm;
the annular seat is a stepped cylindrical reducer-shaped, annular and hollow member disposed in front of the diaphragm, with a front end of the annular seat provided for pivotally positioning the helical seat, with a square hole formed on a peripheral surface of the annular seat;
the tread-measuring device is inserted in the square hole of the housing and the square hole of the annular seat;
the display panel is fixed to a front end of the annular seat;
the air-guide device is a tube connected to the air hole of the air-guide seat, wherein the pressure-relief valve comprises a seat, a moving rod, an O-shaped ring and a spring, wherein an air faucet is provided at a lower end of the air-guide device;
the tire gauge can measure tire pressure and tread's depth simultaneously.

10. The tire gauge as claimed in claim 2 further comprising:
a diaphragm mounted in the housing;
a helical seat having a first end connected to the diaphragm and a second end connected to an index pointer, with the display panel further including a circular scale for indicating pressure; and
an air guiding device for communicating tire pressure to the diaphragm to move the diaphragm, the helical seat, and the index pointer, with the index pointer indicating the tire pressure on the circular scale.

11. The tire gauge as claimed in claim 10 further comprising:
a pressure-relief valve in the air guiding device.

12. The tire gauge as claimed in claim 11 further comprising:
an air-guide seat; and
an annular seat; and wherein
the housing is a bowl-shaped, annular, hollow member;
a bushing, a transparent piece and a rubber ring are mounted on the housing, with a square hole defined at a mid section of a peripheral wall of the housing;
the air-guide seat is an annular member having an air hole and is disposed in the housing;
the diaphragm is arranged at the front the air-guide seat;
the helical seat is connected to the center of the diaphragm;
the annular seat is a stepped cylindrical reducer-shaped, annular and hollow member disposed in front of the diaphragm, with a front end of the annular seat provided for pivotally positioning the helical seat, with a square hole formed on a peripheral surface of the annular seat;
the tread-measuring device is inserted in the square hole of the housing and the square hole of the annular seat;
the display panel is fixed to a front end of the annular seat;
the air-guide device is a tube connected to the air hole of the air-guide seat, wherein the pressure-relief valve comprises a seat, a moving rod, an O-shaped ring and a spring, wherein an air faucet is provided at a lower end of the air-guide device;
the tire gauge can measure tire pressure and tread's depth simultaneously.

* * * * *